J. GILSON, Sr.
ADJUSTABLE WEEDER.
APPLICATION FILED NOV. 22, 1917.
1,336,623.
Patented Apr. 13, 1920.
2 SHEETS—SHEET 1.
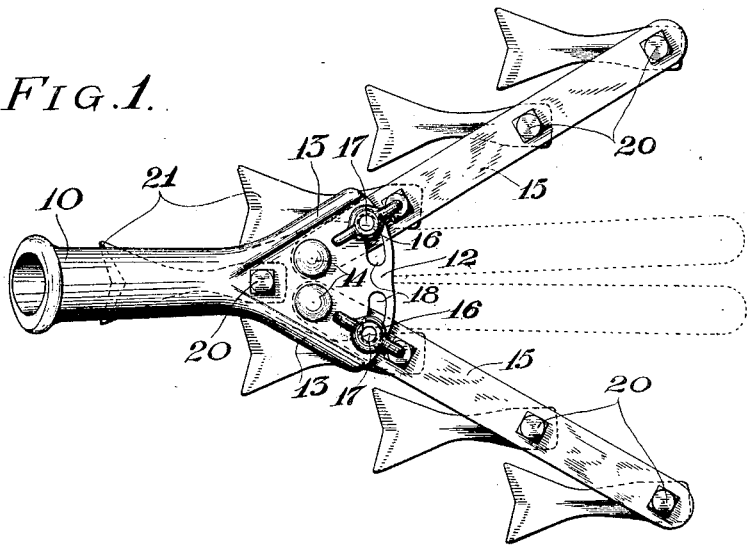
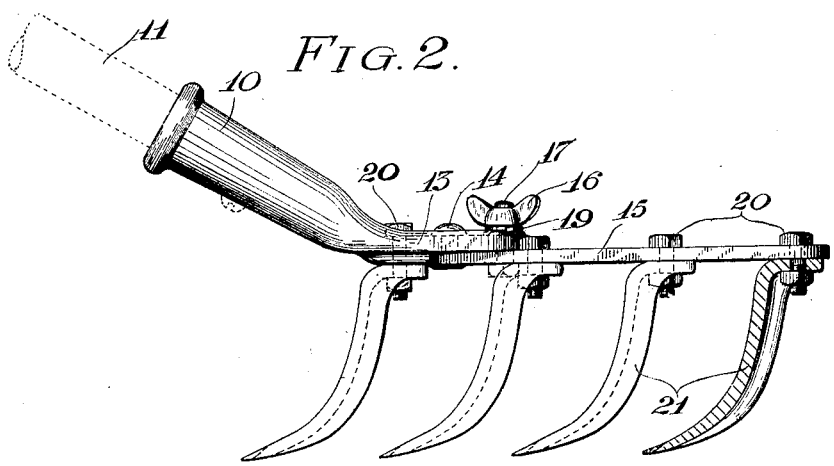
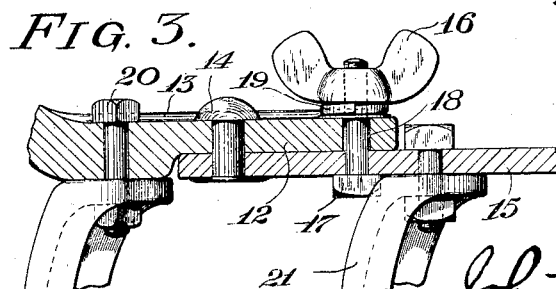
WITNESSES.
INVENTOR.
John Gilson, Sr.
ATTORNEY.

J. GILSON, Sr.
ADJUSTABLE WEEDER.
APPLICATION FILED NOV. 22, 1917.
1,336,623.
Patented Apr. 13, 1920.
2 SHEETS—SHEET 2.
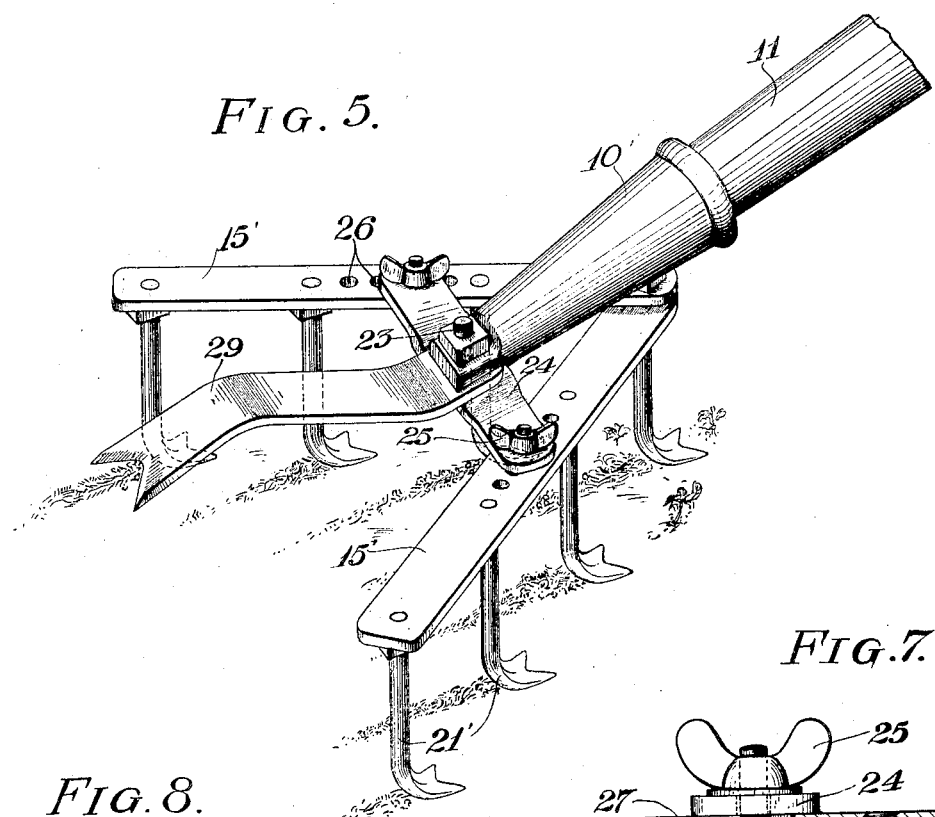
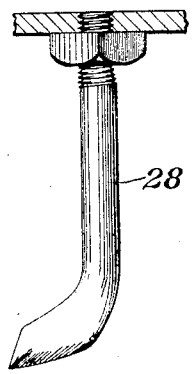
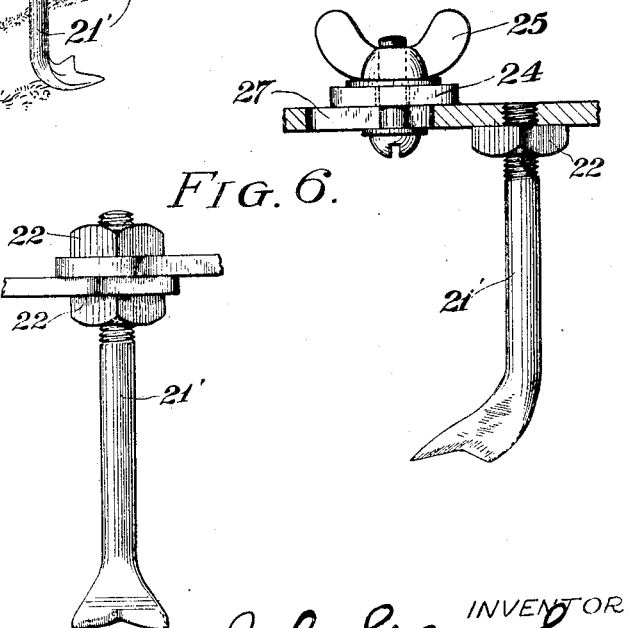
WITNESSES.
C. L. Waal.
H. W. Chase
INVENTOR.
John Gilson, Sr.
R. S. Caldwell
ATTORNEY.

UNITED STATES PATENT OFFICE.

JOHN GILSON, SR., OF PORT WASHINGTON, WISCONSIN, ASSIGNOR TO J. E. GILSON COMPANY, OF PORT WASHINGTON, WISCONSIN, A FIRM CONSISTING OF JOHN GILSON, SR., AND JOHN E. GILSON, JR.

ADJUSTABLE WEEDER.

1,336,623.  Specification of Letters Patent.  Patented Apr. 13, 1920.

Application filed November 22, 1917. Serial No. 203,361.

*To all whom it may concern:*

Be it known that I, JOHN GILSON, Sr., a citizen of the United States, and resident of Port Washington, Ozaukee county, Wisconsin, have invented new and useful Improvements in Adjustable Weeders, of which the following is a description, reference being had to the accompanying drawings, which are a part of this specification.

This invention has for its object to provide a weeder adjustable in width to permit it to cover the full width of the space between rows, whether the rows are spaced nearer together or farther apart.

Another object of the invention is to produce the cutting edge of the weeder by means of teeth somewhat similar in construction and arrangement to cultivator teeth but designed primarily to present a broad forwardly directed approximately horizontal cutting edge for cutting weeds below the surface of the soil.

Another object of the invention is to give to the weeder teeth an inclination that will cause them to have a tendency to cut deeper into the soil as the tool is drawn along and so offset the usual tendency for it to come to the surface.

Another object of the invention is to provide the cutting teeth with V-shaped or converging cutting edges that will shear the stems of weeds toward the center of the cutting edges instead of toward the ends and thus produce a more efficient cutting action.

Another object of the invention is to provide a weeder of this type with a cutting blade provided with a V-shaped knife in its end which may be brought into position for use by inverting the tool and which will be useful for cutting large weeds.

Another object of the invention is to provide the teeth with detachable connections for connecting them to their supports which will permit of their angular adjustment or of their removal for sharpening or repair, or for producing a gap that will permit the tool to straddle a row of plants without injury thereto.

With the above and other objects in view, the invention consists in the weeder, its parts and combinations of parts, as herein claimed and all equivalents.

Referring to the accompanying drawings, in which like characters of reference indicate the same parts in different views:

Figure 1 is a plan view of a weeder constructed in accordance with this invention and showing in dotted lines the position to which the parts may be folded;

Fig. 2 is a side view thereof with one of the weeder teeth sectioned;

Fig. 3 is an enlarged detail view of the clamping connections for the weeder teeth and an adjustable arm;

Fig. 4 is a transverse sectional view of one of the teeth;

Fig. 5 is a perspective view of a modification of the invention;

Fig. 6 is a view of the front tooth thereof;

Fig. 7 is a view of one of the other teeth thereof showing its connection with the adjustable arm; and, Fig. 8 is a view showing a modified form of weeder tooth.

In these drawings 10 indicates a handle socket for attachment to a tool handle 11 as usual. The end of the socket is angular thereto and is spread to a V-shaped or fan-shaped head 12 with raised strengthening ribs 13 at its side edges. Rivets 14 pass through the web portion of the head 12 and form pivotal connections for a pair of adjustable arms 15 which swing beneath the head to various angular positions with relation to each other and to the handle socket and are clamped in their various adjustments by winged nuts 16 on clamping bolts 17 which pass through the arms and travel in arc-shaped slots 18 of the head 12. A spring lock washer 19 is preferably used beneath each of the winged nuts 16 to hold it tight.

Each arm 15 has bolts 20 passing through it at regular intervals and securing to the bottom face thereof a series of weeder teeth 21. Each tooth 21 preferably consists of a casting having an upright portion V-shaped in cross section as seen in Fig. 4, with its upper end extending rearwardly horizontally to receive the bolt 20, as seen in Fig. 2, and its lower end curved forwardly or in the direction of the line of pull as indicated by the direction of the handle socket 10. These lower ends are flaring in width and tapering in thickness and terminate in a wide V-shaped beveled cutting edge that is nearly horizontal, the path of travel of the cutting edge of each tooth slightly overlapping the path of travel of the cutting edge of the preceding tooth. One of the weeder teeth 21 is attached directly to the head 12 in advance of the others and forms a central leader tooth at the apex of the V-shaped formation in which the two rows of teeth are arranged.

In use the tool is drawn toward the operator with the forwardly curved blades a slight distance beneath the surface of the soil where they will cut the weeds with their angular cutting edges and make a clean cutting operation the full width of the tool because of the overlap in the paths of travel of the various teeth. The inclination of the ends of the teeth causes them to have a tendency to sink deeper into the soil to overcome the natural tendency of any tool to rise to the surface. The shape of the cutting edges of the teeth is such that they present recesses or notches in which the weeds are caught, instead of presenting points for deflecting them to one side or the other as with cultivator teeth.

The effective width of the tool may be varied by loosening the winged nuts 16 and swinging the arms on their pivotal connections 14 so as to adapt the tool for use the full width of the space between rows. While the teeth are adjustable on the arms 15 to permit of their being directed forwardly in any width adjustment of the tool, such adjustment is not necessary to an even draft of the tool, for whatever side draft may be created by reason of the angular position of teeth on one side will be neutralized by the opposite side draft of teeth on the other side. When it is desired to operate on both sides of a row of plants, the front or leader tooth may be removed from the head of the tool, which will leave a gap in the series of cutting teeth that will permit the tool to pass over the plants without injury to them.

It will be understood that the cutting teeth, while primarily intended as means for cutting the weeds, serve also as cultivator teeth for loosening the soil or as hoe blades for slicing the soil and breaking the conductivity thereof for capillary attraction.

The tool of this invention is a hand tool as contradistinguished from the horse drawn implements of the harrow or tooth cultivator type and the tool is of the reciprocating type having the action of a scuffle hoe as distinguished from tools of the chopping type having the action of the ordinary garden hoe. During the forward or pulling stroke the inclination of the fishtail-shaped cutting ends of the teeth causes them to tend to dig downwardly and thus offset the natural tendency of a tool to rise to the surface, whereas, on the return or pushing stroke the shape and inclination of the ends of the teeth serve to bring the tool to the surface and press the clods downwardly so as to crush them effectively and thus pulverize the soil. This action is true whether the tool is used with the center tooth, in working between rows, or without the center tooth, when working on both sides of a row of seedlings or small plants capable of passing beneath the center of the tool. By reason of the V-shaped arrangement of the teeth the said operation may be performed equally well whether the surface is level or ridged or trenched, a change in the inclination of the handle being all that is necessary to adapt it to these conditions.

At the point of attachment of the front or leader tooth 21 the head is provided with an enlargement to bring it to the same level as the lower surface of the arms 15 so that all teeth may be uniform and cast from the same pattern.

In the modification shown in Fig. 5 the teeth 21' have their upper ends threaded in the adjustable arms 15' and are held in their angular adjustments by lock nuts 22 threaded thereon. These arms 15' instead of being pivotally mounted on a head casting, as before, are pivotally connected together by being both mounted on the leader tooth 21' between a pair of nuts 22. The handle socket 10' is clamped by a bolt 23 to a cross piece 24 which has its end connected to the arms 15' by means of thumb bolts 25, and the angular adjustment of the arms is accomplished by fitting said thumb bolts 25 in the different openings of a series of openings 26 in said arms. Instead of the series of openings 26, a slot 27 may be used for this purpose, as shown in Fig. 7. The operation of this form of the invention is the same as with the other.

In Fig. 8 a modified form of tooth 28 is shown more in the nature of a cultivator tooth with a pointed cutting edge instead of a notched cutting edge.

With either form of the invention a cutting blade 29 may be used for cutting larger weeds or weeds growing in the row between plants and this blade may be attached to the bolt 23 between the handle socket 10' and the cross bar 24 with the form of the invention as shown in Fig. 5, or it may be attached to the leader tooth bolt 20 in the form of the invention shown in Figs. 1, 2 and 3. The blade 29 is preferably bent in the manner shown in Fig. 5 to have its cutting end approximately parallel with the handle and said cutting end has a notched cutting edge of a V-shape which is brought into use by pushing the blade toward the weed so as to engage it below the surface of the soil.

It is obvious that many changes may be made in the specific construction of the tool shown and described without departing from the invention, and I therefore desire it to be understood that this invention is not limited to any specific form or arrangement of parts except in so far as such limitations are specified in the claim.

The recessed or notched cutting edge of the teeth causes them to act with greater efficiency, for when they engage the stem or root of a weed it is with a shearing action, the knife edge being positioned obliquely with relation to its line of travel. This shearing action tends to draw the stem or root inwardly toward the center of the blade where it will engage with the crotch of the notch and be sheared thereby instead of being thrown off to one side or the other as would be the case with a pointed cutting edge.

What I claim as new and desire to secure by Letters Patent is:

A weeder, comprising a handle socket having an angularly positioned fan-shaped head, arms pivotally mounted on the head, clamping screws on the arms fitting in slots of the head for binding the arms in angular adjustments, and teeth secured to the head and to the arms and projecting downwardly and curving forwardly with their front ends provided with broad recessed knife edges the path of each tooth overlapping the path of the next tooth.

In testimony whereof I affix my signature in presence of two witnesses.

JOHN GILSON, Sr.

Witnesses:
G. H. ADAM,
J. E. USELDING.